US012767810B2

(12) United States Patent
Higuma et al.

(10) Patent No.: US 12,767,810 B2
(45) Date of Patent: Oct. 20, 2026

(54) ACRYLIC RUBBER COMPOSITION

(71) Applicant: NOK CORPORATION, Tokyo (JP)

(72) Inventors: Takahiro Higuma, Kanagawa (JP); Takuto Shimamura, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 684 days.

(21) Appl. No.: 18/018,142

(22) PCT Filed: Jul. 26, 2021

(86) PCT No.: PCT/JP2021/027523

§ 371 (c)(1),
(2) Date: Jan. 26, 2023

(87) PCT Pub. No.: WO2022/024986

PCT Pub. Date: Feb. 3, 2022

(65) Prior Publication Data

US 2023/0272203 A1 Aug. 31, 2023

(30) Foreign Application Priority Data

Jul. 27, 2020 (JP) ................................ 2020-126463

(51) Int. Cl.

| | |
|---|---|
| ***C08K 3/36*** | (2006.01) |
| ***C08K 5/10*** | (2006.01) |
| ***C08L 33/08*** | (2006.01) |
| ***C09K 3/10*** | (2006.01) |

(52) U.S. Cl.

CPC ................ *C08L 33/08* (2013.01); *C08K 3/36* (2013.01); *C08K 5/10* (2013.01); *C09K 3/10* (2013.01); *C08L 2205/06* (2013.01); *C08L 2312/00* (2013.01); *C09K 2200/0247* (2013.01); *C09K 2200/0642* (2013.01)

(58) Field of Classification Search

CPC ....... C09K 2200/0642; C08F 220/1802; C08F 220/1808; C08F 220/281; C08F 220/1804; C08F 220/14; C08F 222/16

See application file for complete search history.

(56) References Cited

U.S. PATENT DOCUMENTS

| | | | | |
|---|---|---|---|---|
| 7,459,495 B2 | 12/2008 | Kubota et al. | | |
| 9,840,572 B2 | 12/2017 | Emori et al. | | |
| 2005/0080173 A1 | 4/2005 | Kubota et al. | | |
| 2006/0167159 A1 | 7/2006 | Kubota et al. | | |
| 2010/0292394 A1* | 11/2010 | Moritani | .................. | C08K 3/04 524/560 |
| 2015/0035236 A1 | 2/2015 | Tsuda | | |
| 2017/0121439 A1 | 5/2017 | Emori et al. | | |
| 2020/0010597 A1 | 1/2020 | Mosaki | | |
| 2020/0299443 A1 | 9/2020 | Toge et al. | | |

FOREIGN PATENT DOCUMENTS

| | | | | |
|---|---|---|---|---|
| JP | 2001-240623 A | 9/2001 | | |
| JP | 2001-342321 A | 12/2001 | | |
| JP | 2004-131545 A | 4/2004 | | |
| JP | 2010-229285 A | 10/2010 | | |
| WO | WO1996036651 A1 * | 11/1996 | ............ | C08F 265/04 |
| WO | 2016/002936 A1 | 1/2016 | | |
| WO | 2019/087876 A1 | 5/2019 | | |

OTHER PUBLICATIONS

EESR issued in EP Patent Application No. 21850379.5, Jul. 16, 2024.
ISR issued in WIPO Patent Application No. PCT/JP2021/027523, Sep. 7, 2021, translation.
IPRP issued in WIPO Patent Application No. PCT/JP2021/027523, Jan. 31, 2023, translation.

* cited by examiner

*Primary Examiner* — Joseph S Del Sole
*Assistant Examiner* — Huihong Qiao
(74) *Attorney, Agent, or Firm* — GREENBLUM & BERNSTEIN, P.L.C.

(57) ABSTRACT

An acrylic rubber composition that includes a blend product of an acrylic rubber [I] containing a copolymer of an ethyl acrylate/n-butyl acrylate/2-methoxyethyl acrylate/carboxyl group-containing vinyl monomer, and an acrylic rubber [II] containing a copolymer of an alkoxyalkyl acrylate/2-ethylhexyl acrylate/alkyl methacrylate/ethyl acrylate/carboxyl group-containing vinyl monomer; the blend product being compounded with silica and a plasticizer.

11 Claims, No Drawings

ACRYLIC RUBBER COMPOSITION

TECHNICAL FIELD

The present invention relates to an acrylic rubber composition. More particularly, the present invention relates to an acrylic rubber composition having excellent hydrolysis resistance, etc.

BACKGROUND ART

Acrylic rubber is a rubber material that has an excellent balance in heat resistance, cold resistance, oil resistance, etc., and is thus used for general sealing materials for automobiles, and particularly widely used as sealing members for sealing low polarity oils, such as engine oil. However, in recent years, the following points have been required to be improved.

(1) Since acrylic rubber is a structure in which acrylic acid ester units are polymerized, hydrolysis in the ester bond portion occurs due to water mixed into engine oil, exhaust gas components, acids, bases, and the like. Further, since the hydrolyzed acrylic rubber becomes a highly hydrophilic polyacrylic acid-based structure, the water resistance is significantly deteriorated as compared with the original acrylic rubber, and further hydrolysis is induced.

(2) Acrylic rubber is hardened and deteriorated by hydrolysis, and its function as a sealing material is lowered due to the deterioration of compression set resistance characteristics.

(3) Since acrylic rubber sealing materials are often used around oil, oil resistance and cold resistance in consideration of use in cold regions are also important, and a material design that optimizes these physical properties is required.

(4) Due to harsh usage environments and the insufficient maintenance of automobiles, it is required to improve the resistance of acrylic rubber to deteriorated oil.

Patent Document 1 proposes an acrylic rubber comprising (a) 10 to 20 wt. % of methyl methacrylate unit, (b) 15 wt. % or less of ethyl acrylate unit, (c) 60 to 80 wt. % of n-butyl acrylate unit, (d) 10 to 30 wt. % of 2-methoxyethyl acrylate unit, and (e) 0.5 to 5 wt. % of crosslinking site monomer unit. Patent Document 1 indicates that this acrylic rubber provides an acrylic rubber crosslinked product having a good balance between oil resistance and cold resistance, and further having excellent hydrolysis resistance. However, water resistance after hydrolysis resistance test has not been examined.

Further, Patent Document 2 discloses an acrylic rubber comprising a copolymer of a monomer mixture of 25 to 46 wt. % of alkoxyalkyl acrylate, 23 to 3 wt. % of 2-ethylhexyl acrylate, 9 to 17 wt. % of alkyl methacrylate, 1 to 3 wt. % of monoalkyl fumarate, and a remaining component of ethyl acrylate.

However, as shown in Comparative Examples 2 and 3, provided later, when one type of acrylic rubber is used, desired water resistance after hydrolysis resistance test cannot be satisfied.

PRIOR ART DOCUMENT

Patent Document

Patent Document 1: WO 2016/002936 A1
Patent Document 2: WO 2019/087876 A1
Patent Document 3: JP-A-2010-229285

OUTLINE OF THE INVENTION

Problem to be Solved by the Invention

An object of the present invention is to provide an acrylic rubber composition used as an acrylic rubber material that satisfies, in good balance, all of various types of performance, such as oil resistance, cold resistance, hydrolysis resistance, and water resistance after hydrolysis resistance test.

Means for Solving the Problem

The above object of the present invention can be achieved by an acrylic rubber composition comprising a blend product of an acrylic rubber [I] comprising copolymer of an ethyl acrylate/n-butyl acrylate/2-methoxyethyl acrylate/carboxyl group-containing vinyl monomer, and an acrylic rubber [II] comprising copolymers of an alkoxyalkyl acrylate/2-ethylhexyl acrylate/alkyl methacrylate/ethyl acrylate/carboxyl group-containing vinyl monomer; the blend product being compounded with silica and a plasticizer.

Effect of the Invention

The acrylic rubber composition according to the present invention satisfies, in good balance, all of the characteristics, such as oil resistance and hydrolysis resistance, as well as water resistance after hydrolysis resistance test, by blending a general-purpose acrylic rubber comprising copolymer of an ethyl acrylate/n-butyl acrylate/2-methoxyethyl acrylate/carboxyl group-containing vinyl monomer with an acrylic rubber comprising copolymer of an alkoxyalkyl acrylate/2-ethylhexyl acrylate/alkyl methacrylate/ethyl acrylate/carboxyl group-containing vinyl monomer, the copolymer whose polarity has been adjusted by copolymerizing 2-ethylhexyl acrylate, which has low polarity and low hydrophilicity, with alkoxyalkyl acrylate, which has high polarity.

Moreover, scorch stability can be improved by compounding silica as a filler in the rubber composition. In addition, compounding a suitable amount of plasticizer makes it possible to obtain an acrylic rubber crosslinked product that has excellent oil resistance to low swelling oil (e.g., No. 1 of JIS K6258 corresponding to ISO 1817: 2015) and No. 3 of JIS K6258 corresponding to ISO 1817: 2015, and swelling resistance and cold resistance to highly swelling oil. Such rubber compositions are effectively used as seal molding materials for oil seals, O-rings, gaskets, packings, and the like.

EMBODIMENTS FOR CARRYING OUT THE INVENTION

The acrylic rubber composition according to the present invention comprises a blend product of a general-purpose acrylic rubber [I] comprising an ethyl acrylate/n-butyl acrylate/2-methoxyethyl acrylate/carboxyl group-containing vinyl monomer copolymer, and an acrylic rubber [II] comprising an alkoxyalkyl acrylate/2-ethylhexyl acrylate/alkyl methacrylate/ethyl acrylate/carboxyl group-containing vinyl monomer copolymer; the blend product being compounded with silica and a plasticizer.

The general-purpose acrylic rubber [I] comprising an ethyl acrylate/n-butyl acrylate/2-methoxyethyl acrylate/carboxyl group-containing vinyl monomer copolymer is known, as shown, for example, in Patent Document 3, and examples thereof include the following acrylic rubber.

| ACM-1 | |
|---|---|
| Ethyl acrylate [EA] | 45.5 wt. % |
| n-Butyl acrylate [BA] | 32 wt. % |
| 2-Methoxyethyl acrylate [MEA] | 21 wt. % |
| Mono n-butyl fumarate [MBF] | 1.5 wt. % |

Moreover, examples of the acrylic rubber [II] comprising copolymer of an alkoxyalkyl acrylate/2-ethylhexyl acrylate/alkyl methacrylate/ethyl acrylate/carboxyl group-containing vinyl monomer include the following acrylic rubber.

| ACM-2 | |
|---|---|
| Alkoxyalkyl acrylate (ex. MEA) | 34 wt. % |
| 2-Ethylhexyl acrylate [EHA] | 34 wt. % |
| Alkyl methacrylate (methyl methacrylate [MMA]) | 15 wt. % |
| Ethyl acrylate | 15.5 wt. % |
| Mono n-butyl fumarate | 1.5 wt. % |

These are used in such a manner that the weight ratio of acrylic rubber [I] to acrylic rubber [II] is 10:90 to 40:60, preferably 15:85 to 35:65. The acrylic rubber [II] alone is inferior in oil resistance and water resistance after hydrolysis due to the influence of 2-ethylhexyl acrylate, which is introduced to enhance oil resistance and hydrolysis resistance; however, the acrylic rubber [I], which is conventionally widely used, is blended to thereby reduce the weight ratio of 2-ethylhexyl acrylate and to improve oil resistance. Further, since n-butyl acrylate is co-crosslinked by blending, a well-balanced formulation that does not impair cold resistance can be ensured. If ACM-1 is blended at a ratio greater than this range, the weight ratio of 2-ethylhexyl acrylate is overly reduced, and hydrolysis resistance that can withstand practical use is impaired.

As the acrylic rubber blend product, one in which the weight ratio of each monomer after blending comprises 16 to 30 wt. %, preferably 20 to 28 wt. %, of ethyl acrylate, 0.1 to 15.5 wt. %, preferably 5 to 13 wt. %, of n-butyl acrylate, 28 to 33.5 wt. %, preferably 29 to 32 wt. %, of alkoxyalkyl acrylate, preferably 2-methoxyethyl acrylate, 17.5 to 33.5 wt. %, preferably 20 to 30 wt. %, of 2-ethylhexyl acrylate, 8 to 14.5 wt. %, preferably 9 to 12 wt. %, of alkyl methacrylate, preferably methyl methacrylate, and 1 to 3 wt. %, preferably 1 to 2 wt. %, of the carboxyl group-containing vinyl monomer is used.

Here, as the carboxyl group-containing vinyl monomer, for example, monocarboxylic acids, such as acrylic acid and methacrylic acid; mono lower alkyl esters, such as monomethyl, monoethyl, and monobutyl esters of dicarboxylic acids, such as maleic acid, fumaric acid, itaconic acid, and citraconic acid are used. Butenedionic acid monoalkyl esters, such as monobutyl maleate, monobutyl fumarate, and monoethyl fumarate, are preferably used.

If the amount of ethyl acrylate in the acrylic rubber blend product is greater than the above range, hydrolysis resistance is inferior. In contrast, if the amount of ethyl acrylate is less than the above range, oil resistance and water resistance after hydrolysis are inferior.

If the amount of n-butyl acrylate in the acrylic rubber blend product is greater than the above range, hydrolysis resistance is inferior. In contrast, if the amount of n-butyl acrylate is less than the above range, oil resistance and water resistance after hydrolysis are inferior.

If the amount of the alkoxyalkyl acrylate in the acrylic rubber blend product is greater than the above range, hydrolysis resistance is inferior. In contrast, if the amount of the alkoxyalkyl acrylate is less than the above range, oil resistance and water resistance after hydrolysis are inferior.

If the amount of 2-ethylhexyl acrylate (octyl acrylate) in the acrylic rubber blend product is greater than the above range, oil resistance and water resistance after hydrolysis are inferior. In contrast, if the amount of 2-ethylhexyl acrylate is less than the above range, hydrolysis resistance is inferior.

If the amount of the alkyl methacrylate in the acrylic rubber blend product is greater than the above range, oil resistance and water resistance after hydrolysis are inferior. In contrast, if the amount of the alkyl methacrylate is less than the above range, hydrolysis resistance is inferior.

In the copolymer, other copolymerizable monomers can be copolymerized, as long as the properties thereof are not impaired. Examples of such copolymerizable monomers include vinyl compounds such as styrene, vinyl toluene, α-methyl styrene, vinyl naphthalene, acrylonitrile, methacrylonitrile, acetone acrylamide, 2-hydroxyethyl acrylate, 4-hydroxybutyl acrylate, 2-hydroxy-3-chloropropyl (meth) acrylate, vinyl chloride, vinylidene chloride, vinyl fluoride, vinylidene fluoride, chloroethyl vinyl ether, hydroxyethyl vinyl ether, hydroxybutyl vinyl ether, pentafluoropropyl (meth)acrylate, trifluoroethyl (meth)acrylate, and diene compounds such as isoprene, pentadiene, butadiene.

In the copolymer comprising each of these monomer components, in order to facilitate the emulsification and dispersion of the copolymer, a hydrophilic monomer, such as a quaternary salt of N,N-dimethylaminoethyl (meth) acrylate, polyethylene glycol mono(meth)acrylate, polypropylene glycol mono(meth)acrylate, or polyethylene glycol polypropylene glycol mono(meth)acrylate, can be further copolymerized at a ratio of 1 wt. % or less.

Manufacturing the acrylic rubber is performed by an emulsion polymerization method. In the emulsion polymerization method, each monomer is emulsified and dispersed in an aqueous medium using various surfactants, preferably a nonionic surfactant, a cationic surfactant, or a mixture thereof. Then, a polymerization reaction is carried out while stirring under the condition of room temperature or under the condition of heating, in the presence of a polymerization initiator. In this case, before the emulsification polymerization reaction, if necessary, the monomer mixture is emulsified and dispersed in an aqueous medium by a powerful emulsification means, such as a high-pressure homogenizer, a colloid mill, or an ultrasonic disperser.

That is, each of these polymerizable monomers is copolymerized preferably in the presence of a surfactant emulsifier, such as a polyethylene oxide-based nonionic surfactant or a cationic surfactant, and optionally a polypropylene glycol-based compound emulsifying aid having a molecular weight of about 250 to 5000, preferably about 300 to 3000.

As the surfactant acting as an emulsifier, at least one of a polyethylene oxide-based nonionic surfactant and a cationic surfactant is preferably used at a ratio of 1 to 20 wt. %, preferably 5 to 15 wt. %, based on the total amount of monomers. The polyethylene oxide-based nonionic surfactant used herein is a condensation reaction product of polyethylene oxide with hexylphenol, octylphenol, nonylphenol, polycyclic phenyl ether, hexadecanol, oleic acid, $C_{12}$-$C_{18}$ alkylamine, or sorbitan monofatty acid. A condensation reaction product of polyethylene oxide with octylphenol or nonylphenol is preferably used.

As the cationic surfactant, quaternary ammonium salts such as stearyl trimethyl ammonium chloride, distearyldimethyl ammonium chloride, dodecyl trimethyl ammonium acetate, dodecyl trimethyl ammonium chloride, tetradecyl trimethyl ammonium chloride, hexadecyl trimethyl ammonium chloride, octadecyl trimethyl ammonium chloride, dodecyl benzyl trimethyl ammonium chloride, dodecyl methyl di(polyoxyethylene) ammonium chloride and dioctadecyl dimethyl ammonium chloride, and alkyl pyridinium salts are used.

As the polypropylene glycol-based compound as an emulsifying aid used in combination with such an emulsifier, polypropylene glycol, its terminal monomethyl ether, propylene glycol adduct of glycerin, or the like is used at a ratio of 10 to 100 wt. %, preferably 15 to 70 wt. %, based on the total amount of monomers. If a polypropylene glycol-based compound having a molecular weight exceeding 5000 is used, emulsion stability is reduced.

As a polymerization initiator used at a ratio of about 0.001 to 4 wt. %, preferably about 0.005 to 2 wt. %, based on the total amount of the comonomers, diacyl peroxide, peroxycarbonate, peroxyester, or the like, is used. Specific examples thereof include organic peroxides, such as tert-butyl hydroperoxide, isobutyryl peroxide, lauroyl peroxide, stearoyl peroxide, succinic acid peroxide, bis(heptafluorobutyryl) peroxide, pentafluorobutyroyl peroxide, bis(4-tert-butylcyclohexyl) peroxy dicarbonate, di-n-propyl peroxy dicarbonate, and diisopropyl peroxy dicarbonate. Depending on the polymerization reaction, an azo compound, inorganic peroxide, or a redox system thereof can also be used. Depending on the reaction conditions and the composition ratio, the polymerization reaction may hardly progress; in that case, the polymerization initiator may be added again during the polymerization reaction.

Moreover, in order to adjust the molecular weight, a chain transfer agent can be used, if necessary. As the chain transfer agent, for example, n-dodecyl mercaptan, octyl mercaptan, α-methyl styrene dimer, or 1,4-terpinolene, preferably n-dodecyl mercaptan, is used at a ratio of about 0.001 to 0.1 parts by weight, preferably 0.01 to 0.05 parts by weight, based on 100 parts by weight of the total amount of charged monomers. As the amount of chain transfer agent increases, the molecular weight of the resulting copolymer decreases, and the breaking strength and Mooney viscosity $ML_{1+4}$ (100° C.) decrease.

As the emulsion polymer, an aqueous latex having a solid matters content of about 10 to 40 wt. % is coagulated with a sodium sulfate aqueous solution, followed by water washing and drying, thereby obtaining an acrylic rubber.

In the acrylic rubber blend product, silica is compounded as a filler at a ratio of about 30 to 120 parts by weight, preferably about 50 to 100 parts by weight, based on 100 parts by weight of the acrylic rubber blend product. If silica is used at a ratio less than this range, scorch stability is deteriorated, and the oil resistance and water resistance after hydrolysis of the resulting rubber are deteriorated. In contrast, if silica is used at a ratio greater than this range, the elongation of the material is deteriorated. Further, when a filler other than silica, such as carbon black, is used as the filler, the scorch time is shortened, and the storage stability of the unvulcanized compound is inferior.

Moreover, in the acrylic rubber, a plasticizer, such as epoxy resin, a phthalic acid derivative, or a sebacic acid derivative, is used. Preferably, an ester-based plasticizer is compounded at a ratio of about 2 to 8 parts by weight, preferably about 3 to 7 parts by weight, based on 100 parts by weight of the acrylic rubber blend product. The ester group may be an alkoxyalkyl ester. If the plasticizer is used at a ratio less than this range, desired cold resistance cannot be obtained. In contrast, if the plasticizer is used at a ratio greater than this range, the plasticizer is extracted by the oil, and sealing properties are deteriorated.

Examples of the crosslinking agent for the carboxyl group-containing acrylic rubber include a polyamine (salt) compound, a combination of a polyepoxy compound and a quaternary ammonium salt, a quaternary phosphonium salt or a combination of a quaternary phosphonium salt and a basic compound, a combination of a polyamine or polyamine salt and a guanidine derivative, and the like. A polyamine compound is preferably used.

As the polyamine compound, hexamethylenediamine, hexamethylenediamine carbamate, tetramethylenepentamine, 4,4'-methylenedianiline, m-phenylenediamine, 4,4'-diaminodiphenyl ether, or the like is used at a ratio of about 0.1 to 10 parts by weight, preferably about 0.2 to 5 parts by weight, based on 100 parts by weight of rubber. If the ratio is less than this range, vulcanization is insufficient, and a vulcanizate having satisfactory tensile strength and compression set resistance characteristics cannot be obtained. In contrast, if the poly amine compound is used at a ratio greater than this range, the elongation of the vulcanizate significantly decreases.

Such a polyamine compound is desirably used in combination with a vulcanization accelerator. As the vulcanization accelerator, for example, the followings are used at a ratio of about 0.1 to 10 parts by weight, preferably about 0.5 to 5 parts by weight, based on 100 parts by weight of rubber.

Alkali metal salts or alkali metal hydroxides of organic acids or inorganic acids, such as sodium stearate, potassium stearate, potassium oleate, sodium carbonate, potassium carbonate, sodium hydroxide, and potassium hydroxide Quaternary ammonium salts or phosphonium salts, such as tetramethylammonium bromide, benzyltriphenylphosphonium chloride, trimethyloctadecylammonium bromide, and tetramethylphosphonium iodide Tertiary amines, such as triethylenediamine, imidazole, pyridine, and quinoline Guanidines, such as diphenylguanidine and tetramethylguanidine A vulcanizable rubber composition is prepared by mixing each of the above components, together with other known compounding agents, such as stabilizers, and lubricants, by a generally used method, such as a roll mixing method or a Banbury mixing method. For the vulcanization thereof, primary vulcanization is performed by press vulcanization or steam vulcanization at about 150 to 200° C. for about 1 to 30 minutes, and, if necessary, secondary vulcanization is performed in an oven at about 150 to 200° C. for about 1 to 20 hours.

EXAMPLES

The following describes the present invention with reference to Examples.

Example 1

Using a sealed kneader, the following components were compounded and kneaded based on 100 parts by weight of an acrylic rubber blend product comprising 30 parts by weight of ACM-1 and 70 parts by weight of ACM-2 (monomer weight ratio of EA:BA:MEA:EHA:MMA:MBF=24.5:9.6:30.1:23.8:10.5:1.5).

| | |
|---|---|
| Silica (Nipsil E74P, produced by Tosoh Corporation) | 75 parts by weight |
| Silane coupling agent (Z-6011, produced by Dow Toray Co., Ltd.) | 1 part by weight |
| Stearic acid (produced by Miyoshi Oil & Fat Co., Ltd.) | 1 part by weight |
| Liquid paraffin (Liquid Paraffin 70S, produced by Sanko Chemical Industry Co., Ltd.) | 2 parts by weight |
| Antioxidant (Nocrac CD, produced by Ouchi Shinko Chemical Industrial Co., Ltd.) | 2 parts by weight |
| Plasticizer (ADK CIZER C-9N, produced by ADEKA Corporation) | 5 parts by weight |

Then, the following components were added using an open roll to prepare a crosslinkable acrylic rubber composition.

| | |
|---|---|
| Vulcanizing agent (CHEMINOX AC-6, produced by UNIMATEC CO., LTD.) | 0.6 parts by weight |
| Vulcanization accelerator (Vulcofac ACT-55, produced by Safic-Alcan) | 1 part by weight |

The acrylic rubber blend product was subjected to press vulcanization at 180° C. for 6 minutes, followed by oven vulcanization (secondary vulcanization) at 175° C. for 10 hours, thereby obtaining an acrylic rubber crosslinked product.

Example 2

In Example 1, the amount of ACM-1 was changed to 10 parts by weight, and the amount of ACM-2 was changed to 90 parts by weight, respectively. The monomer weight ratio of the copolymer was EA:BA:MEA:EHA:MMA:MBF=18.5:3.2:32.7:30.6:13.5:1.5).

Example 3

In Example 1, the amount of ACM-1 was changed to 20 parts by weight, and the amount of ACM-2 was changed to 80 parts by weight, respectively. The monomer weight ratio of the copolymer was EA:BA:MEA:EHA:MMA:MBF=21.5:6.4:31.4:27.2:12.0:1.5).

Example 4

In Example 1, the amount of ACM-1 was changed to 40 parts by weight, and the amount of ACM-2 was changed to 60 parts by weight, respectively. The monomer weight ratio of the copolymer was EA:BA:MEA:EHA:MMA:MBF=27.5:12.8:28.8:20.4:9.0:1.5).

Example 5

In Example 1, the amount of the plasticizer was changed to 2 parts by weight.

Example 6

In Example 1, the amount of the plasticizer was changed to 8 parts by weight.

Comparative Example 1

In Example 1, 60 parts by weight of carbon black (Seast S, produced by Tokai Carbon Co., Ltd.) was used in place of silica.

Comparative Example 2

In Comparative Example 1, 100 parts by weight of ACM-2 (The monomer weight ratio of the copolymer was EA:BA:MEA:EHA:MMA:MBF=15.5:0:34.0:34.0:15.0:1.5) was used in place of the acrylic rubber blend product.

Comparative Example 3

In Example 1, 100 parts by weight of ACM-2 was used in place of the acrylic rubber blend product.

Comparative Example 4

In Example 1, the amount of silica was changed to 70 parts by weight, and no plasticizer was used.

Comparative Example 5

In Example 1, the amount of silica was changed to 80 parts by weight, and the amount of the plasticizer was changed to 10 parts by weight, respectively.

Comparative Example 6

In Example 1, the amount of ACM-1 was changed to 50 parts by weight, and the amount of ACM-2 was changed to 50 parts by weight, respectively. The monomer weight ratio of the copolymer was EA:BA:MEA:EHA:MMA:MBF=30.5:16.0:27.5:17.0:7.5:1.5).

Comparative Example 7

In Example 1, 0.5 parts by weight of 2,4,6-trimercapto-S-triazine (Nocceler TCA, produced by Ouchi Shinko Chemical Industrial Co., Ltd.) was used as the vulcanizing agent, and 1.5 parts by weight of zinc dibutyldithiocarbamate (Nocceler BZ-P, produced by Ouchi Shinko Chemical Industrial Co., Ltd.) was used as the vulcanization accelerator. However, crosslinking could not be performed.

Using the acrylic rubber blend product obtained in each of Examples 1 to 6 and Comparative Examples 1 to 6 above, the scorch stability of the composition was measured, and using the acrylic rubber crosslinked product, normal state physical properties, extraction resistance, oil resistance, cold resistance, water resistance after hydrolysis, and hydrolyzability were measured and evaluated.

Scorch stability: according to JIS K6300 corresponding to ISO 289

Normal state physical properties: according to JIS K6253 and JIS K6251 corresponding to ISO 37

T5 value of >5.0 was evaluated as ◎, 3.0 to 5.0 as ○, and <3.0 as X.

Extraction resistance test: according to JIS K6258 corresponding to ISO 1817

The volume change rate (ΔV) after dipping in a dipping test oil IRM 901 at 150° C. for 70 hours was measured. ΔV of −2 to +2% was evaluated as ◎, −5 to −3% or +3 to +5% as ○, and ≤−6% or ≥+6 as X.

Oil resistance test: according to JIS K6258 corresponding to ISO 1817

The volume change rate (ΔV) after dipping in a dipping test oil IRM 903 at 150° C. for 70 hours was measured. ΔV of ±0 to +25% was evaluated as ◎, +26 to +29% as ○, and ≥+30 as X.

Cold resistance test: according to JIS K6261-4 corresponding to ISO 2921

TR10 values were measured. TR10 value of ≤−28 was evaluated as ◎, −27 to −25 as ○, and ≥−24 as X.

Water resistance test after hydrolysis: according to JIS K6258 corresponding to ISO 1817

The volume change rate (ΔV) after dipping in a 1 wt. % zinc chloride aqueous solution at 120° C. for 500 hours was measured. ΔV of ±0 to +5 was evaluated as ◎, +6 to +10% as ○, and ≥+11 as X.

Hydrolysis resistance test: according to JIS K6258 corresponding to ISO 1817

The volume change rate (ΔV) after dipping in a 1 wt. % zinc chloride aqueous solution at 120° C. for 500 hours, followed by drying in the air at 120° C. for 70 hours was measured. ΔV of −9 to ±0% was evaluated as ◎, −15 to −10% as ○, and ≤−16 as X.

The following table 1 (Examples) and table 2 (Comparative Examples) show the results of the above test of physical properties.

TABLE 1

| | Ex. 1 | Ex. 2 | Ex. 3 | Ex. 4 | Ex. 5 | Ex. 6 |
|---|---|---|---|---|---|---|
| [Scorch stability ] | | | | | | |
| T5 | 4.8 | 5.1 | 4.9 | 4.5 | 4.6 | 4.9 |
| Evaluation | ○ | ◎ | ○ | ○ | ○ | ○ |
| [Normal state physical properties] | | | | | | |
| Hardness Hs (Points) | 68 | 68 | 68 | 68 | 69 | 67 |
| Breaking strength (MPa) | 9.51 | 9.34 | 9.63 | 9.41 | 9.80 | 9.00 |
| Elongation at break (%) | 180 | 190 | 170 | 190 | 180 | 180 |
| [Extraction resistance] | | | | | | |
| Volume change rate (%) | −3 | −2 | −3 | −3 | −1 | −5 |
| Evaluation | ○ | ◎ | ○ | ○ | ◎ | ○ |
| [Oil resistance] | | | | | | |
| Volume change rate (%) | +25 | +28 | +27 | +23 | +27 | +23 |
| Evaluation | ◎ | ○ | ○ | ◎ | ○ | ◎ |
| [Cold resistance] | | | | | | |
| TR10 | −26 | −26 | −26 | −26 | −25 | −27 |
| Evaluation | ○ | ○ | ○ | ○ | ○ | ○ |
| [Water resistance after hydrolysis] | | | | | | |
| Volume change rate (%) | +4 | +8 | +5 | +7 | +5 | +4 |
| Evaluation | ◎ | ○ | ◎ | ○ | ◎ | ◎ |
| [Hydrolysis resistance] | | | | | | |
| Volume change rate (%) | −13 | −10 | −12 | −14 | −13 | −14 |
| Evaluation | ○ | ○ | ○ | ○ | ○ | ○ |

TABLE 2

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| [Scorch stability] | | | | | | |
| T5 | 2.5 | 2.9 | 5.3 | 4.3 | 5.1 | 4.3 |
| Evaluation | X | X | ◎ | ○ | ◎ | ○ |
| [Normal state physical properties] | | | | | | |
| Hardness Hs (Points) | 72 | 72 | 69 | 69 | 67 | 68 |
| Breaking strength (MPa) | 11.00 | 11.00 | 9.32 | 10.30 | 8.78 | 9.77 |
| Elongation at break (%) | 220 | 230 | 200 | 170 | 180 | 160 |
| [Extraction resistance] | | | | | | |
| Volume change rate (%) | −2 | −1 | −2 | +1 | −6 | −3 |
| Evaluation | ◎ | ◎ | ◎ | ◎ | X | ○ |
| [Oil resistance] | | | | | | |
| Volume change rate (%) | −31 | +34 | +30 | +29 | +21 | +21 |
| Evaluation | X | X | X | ○ | ◎ | ◎ |
| [Cold resistance] | | | | | | |
| TR10 | −26 | −26 | −26 | −24 | −28 | −27 |
| Evaluation | ○ | ○ | ○ | X | ◎ | ○ |
| [Water resistance after hydrolysis] | | | | | | |
| Volume change rate (%) | +11 | +17 | +14 | +6 | +4 | +9 |
| Evaluation | X | X | X | ○ | ◎ | ○ |

TABLE 2-continued

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| [Hydrolysis resistance] | | | | | | |
| Volume change rate (%) | −12 | −8 | −9 | −12 | −14 | −17 |
| Evaluation | ○ | ◎ | ◎ | ○ | ○ | X |

The above results demonstrate the following.

(1) In each Example, the volume change after the hydrolysis resistance test is small, and oil resistance and cold resistance are well balanced.

(2) Comparative Example 1, in which carbon black is used in place of silica, is inferior in scorch stability, oil resistance, and water resistance after hydrolysis.

(3) Comparative Examples 2 and 3, in which ACM-1 is not blended, and only ACM-2 is used as an acrylic rubber, are inferior in oil resistance and water resistance after hydrolysis.

(4) Comparative Example 4, in which no plasticizer is used, is inferior in cold resistance.

(5) Comparative Example 5, in which a plasticizer is excessively used, is inferior in extraction resistance.

(6) Comparative Example 6, in which the blending ratio of the general-purpose acrylic rubber is high, is inferior in hydrolysis resistance.

The invention claimed is:

1. An acrylic rubber composition comprising a blend product of an acrylic rubber [I] consisting of copolymer of an ethyl acrylate/n-butyl acrylate/2-methoxyethyl acrylate/carboxyl group-containing vinyl monomer, and an acrylic rubber [II] consisting of copolymer of an alkoxyalkyl acrylate/2-ethylhexyl acrylate/alkyl methacrylate/ethyl acrylate/carboxyl group-containing vinyl monomer;

wherein the blend product consisting of the acrylic rubber [I] and the acrylic rubber [II], and being compounded with silica and a plasticizer;

wherein the acrylic rubber [I] and the acrylic rubber [II] are blended in a weight ratio of 10:90 to 40:60.

2. The acrylic rubber composition according to claim 1, wherein the weight ratio of each monomer after acrylic rubber blending comprises 16 to 30 wt. % of ethyl acrylate, 0.1 to 15.5 wt. % of n-butyl acrylate, 28 to 33.5 wt. % of the alkoxyalkyl acrylate or 2-methoxyethyl acrylate, 17.5 to 33.5 wt. % of 2-ethylhexyl acrylate, 8 to 14.5 wt. % of the alkyl methacrylate, and 1 to 3 wt. % of the carboxyl group-containing vinyl monomer.

3. The acrylic rubber composition according to claim 1, wherein the alkyl methacrylate is methyl methacrylate.

4. The acrylic rubber composition according to claim 1, wherein the carboxyl group-containing vinyl monomer is a monoalkyl fumarate.

5. The acrylic rubber composition according to claim 1, wherein 30 to 120 parts by weight of silica, based on 100 parts by weight of the acrylic rubber blend product, is compounded.

6. The acrylic rubber composition according to claim 1, wherein the plasticizer is an ester-based plasticizer.

7. The acrylic rubber composition according to claim 1, wherein 2 to 8 parts by weight of a plasticizer, based on 100 parts by weight of the acrylic rubber blend product, is compounded.

8. The acrylic rubber composition according to claim 1, wherein a crosslinking agent for carboxyl group is further comprised.

9. The acrylic rubber composition according to claim 8, which is suitable for a crosslinking molding material for sealing materials.

10. A sealing material obtained by crosslinking molding of the acrylic rubber composition according to claim 9.

11. An acrylic rubber blend product consisting of an acrylic rubber [I] consisting of copolymer of an ethyl acrylate/n-butyl acrylate/2-methoxyethyl acrylate/carboxyl group-containing vinyl monomer, and an acrylic rubber [II] consisting of copolymer of an alkoxyalkyl acrylate/2-ethylhexyl acrylate/alkyl methacrylate/ethyl acrylate/carboxyl group-containing vinyl monomer, wherein the acrylic rubber [I] and the acrylic rubber [II] are blended in a weight ratio of 10:90 to 40:60, and wherein the weight ratio of each monomer after acrylic rubber blending comprises 16 to 30 wt. % of ethyl acrylate, 0.1 to 15.5 wt. % of n-butyl acrylate, 28 to 33.5 wt. % of the alkoxyalkyl acrylate or 2-methoxyethyl acrylate, 17.5 to 33.5 wt. % of 2-ethylhexyl acrylate, 8 to 14.5 wt. % of the alkyl methacrylate, and 1 to 3 wt. % of the carboxyl group-containing vinyl monomer.

* * * * *